DYNAMIC TEST APPARATUS FOR PIEZOELECTRIC CRYSTALS
Filed Jan. 22, 1947
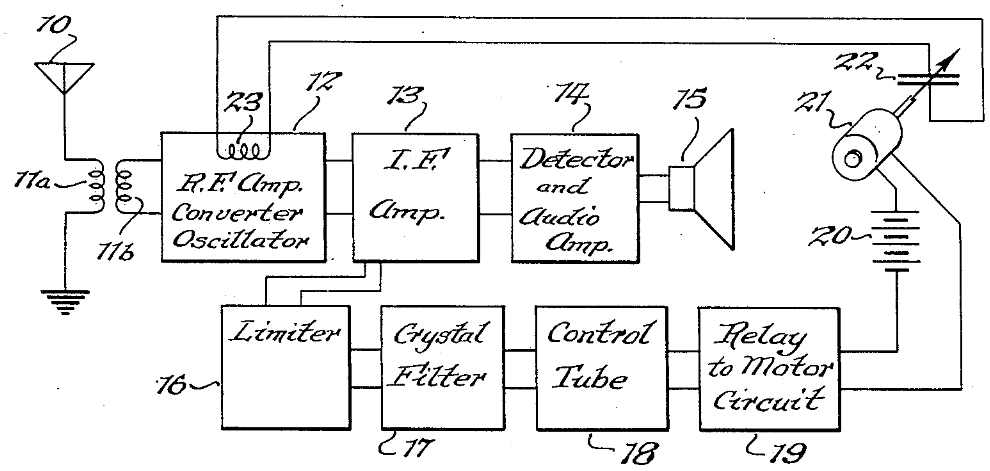
Fig. 1.
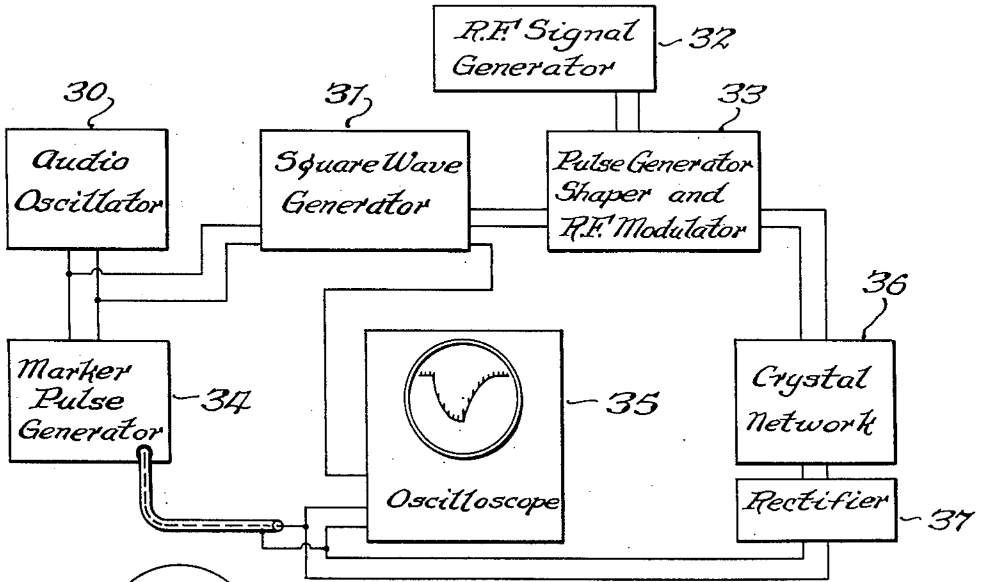
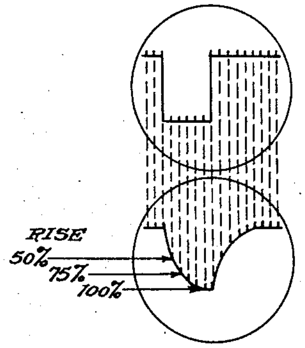
Fig. 3a. Fig. 2. Fig. 3b.
INVENTORS
Dana W. Cole
Roy A. Gull
John C. Pontius
John P. Rug
BY C. A. Norton
ATTORNEY Patented Aug. 8, 1950 2,517,977

UNITED STATES PATENT OFFICE 2,517,977

DYNAMIC TEST APPARATUS FOR PIEZOELECTRIC CRYSTALS

Dana W. Cole, Buffalo, Roy A. Gull, Kenmore, John C. Pontius, Williamsville, and John P. Rug, Buffalo, N. Y., assignors to Colonial Radio Corporation, Buffalo, N. Y.

Application January 22, 1947, Serial No. 723,478

7 Claims. (Cl. 175—183)

This invention relates to test apparatus for piezoelectric crystals, and more particularly to apparatus for predetermining the performance of such crystals in "signal-seeking" receivers.

Among the objects of our invention may be mentioned the following:

To provide apparatus by means of which the piezoelectric crystal voltage rise time may be measured directly.

To provide apparatus by means of which the crystal output voltage is readily determinable under dynamic rather than static conditions.

To provide apparatus by which the measurements may be made at the resonant frequency of the crystal.

To provide apparatus in which different types and cuts of crystals may be quickly compared and the characteristics of the crystals determined, and to provide apparatus which may be utilized for incoming inspection of crystals for production.

Still other objects and advantages of our invention will be apparent from the specification.

The features of novelty which we believe to be characteristic of our invention are set forth with particularity in the appended claims. Our invention itself, however, both as to its fundamental principles and as to its particular embodiments, will best be understood by reference to the specification and accompanying drawing, in which:

Fig. 1 is a circuit diagram of a "signal-seeking" receiver using a piezoelectric crystal, Fig. 2 is a schematic diagram of one form of test apparatus in accordance with our invention, and Figs. 3*a* and 3*b* are curves explaining the operation of our invention.

In order to facilitate an understanding of our invention, it is first necessary to understand in a general way the operation of a "signal-seeking" receiver.

Referring now more particularly to Fig. 1, 10 designates the antenna coupled through coupling coils 11*a* and 11*b* to radio frequency amplifier-converter and oscillator 12, the output of which is supplied to intermediate frequency amplifier 13, the output of which in turn is supplied to detector and audio amplifier 14, and thence to loud-speaker 15. In the form herein shown the receiver will be recognized as of the superheterodyne type particularly adapted for broadcast reception.

In order to provide for operation as a "signal-seeking" receiver, a portion of the output of I. F. amplifier 13 is supplied to limiter 16, which is preferably set to limit at the maximum value of the weakest signal desired to be received. The circuits up to this point have a band width sufficient to accommodate the usual broadcast transmission; i. e., at least 5000 cycles.

The output of limiter 16 is then supplied to crystal filter 17, and the band width of filter 17 is preferably only a small fraction of the band width of the preceding circuits; for instance, filter 17 may have a band pass width of only 500 cycles. The rectified voltage output from the crystal filter is impressed between the control electrode and cathode of tube 18, which contains in its plate circuit relay 19 controlling the circuit of tuner motor 21 energized by suitable source of power 20, and indicated as driving the tuning instrumentality condenser 22 connected across coil 23 in the oscillator tuning circuit.

Control tube 18 and relay 19 are so arranged that in the absence of a received signal no voltage appears on control tube 18, and the relay will be in position closing the motor circuit. Assuming the receiver to be operating, tuner motor 21 will operate, driving tuning instrumentality 22 and scanning the receiver spectrum.

When a signal is tuned in, a voltage is developed across crystal filter 17, which is applied to control tube 18 to cause relay 19 to open the motor circuit, whereupon the receiver will stop scanning and will remain tuned to the incoming signal as long as it is received, or until the operator starts the scanning process by a switch (not shown).

Since the construction and operation of "signal-seeking" receivers is per se no part of this invention, the construction and operation is described only to the foregoing extent, and only because some understanding of the action of such a receiver is necessary to a complete understanding of the invention herein claimed.

In the operation of various "signal-seeking" receivers it was discovered that the characteristics of the crystal employed had a marked effect on the scanning speed which could be employed. It is desirable that this scanning speed be a maximum in order to avoid delay in changing tuning. However, it was found that the permissible scanning speed varied considerably with different crystals.

For instance, with one crystal it might be found that a scanning time of 5 seconds for complete scanning from one end of the spectrum to the other was the shortest that could be employed. Attempts to operate the motor at a faster rate would result in stations being missed. Then, substituting another crystal tuned to the same frequency, it might be found that the scanning speed could be increased, say, to 4 seconds, or it might equally be found that it might have to be reduced to 6 or 7 seconds.

By such a "cut and try" method, it is possible to classify various types and cuts of crystals, but it is apparent that this method is entirely inadequate for production purposes and that some method of selecting crystals according to stopping time (the development of a resonant voltage sufficient to operate the control tube) was necessary in order that uniform scanning speed might be provided, it being obviously impractical to adjust the scanning speed in each receiver to the particular crystal employed therein.

Consideration of the operating requirements shows that, to be satisfactory, the crystal must meet two requirements: (1) It must possess adequate selectivity characteristics in order that the control voltage may be developed at the precise point of receiver resonance ("front end" tuning), and (2) the crystal must develop sufficient voltage to excite the relay control tube grid, and this voltage must develop very rapidly with the start of crystal excitation.

It will be understood that crystal selectivity may be measured under static conditions, but this will give no information on the rate of voltage rise and the maximum voltage developed, because these latter vary as a function of the scanning speed for any particular crystal.

By the use of the apparatus now about to be described, we have found that it is possible to measure each crystal with respect to the voltage developed and the time required for the voltage to rise to any particular fraction of its final value. By the use of this apparatus we are able to inspect a considerable number of crystals in a relatively short time and to discard those whose performance is not satisfactory.

As an example, suppose that all receivers are to be built for a scanning speed of 5 seconds; that is, an elapsed time of 5 seconds for the receiver to tune from one end of its spectrum to the other. Using our apparatus we are able to test the group of crystals and discard any whose rise time is slower than that required for 5 seconds' scanning speed.

The apparatus in accordance with our invention consists of radio frequency signal generator 32 of any well known construction available on the market commercially delivering oscillations of the crystal resonant frequency, in the present instance 455 kc. Signal generator 32 feeds pulse generator such as the Colonial Model 700 pulse generator advertised and described in the periodical "Electrical Equipment" for June 1944 or similar apparatus available on the market, shaper such as shown in U. S. Patent 2,115,881 to Rossenstein, and radio frequency modulator 33 of any well known construction. Pulse generator, shaper, and radio frequency modulator 33 is preferably adjusted to give pulses of from about 1.0 to about 20.0 milliseconds' duration.

Audio oscillator 30 is provided, which may be variable and adjustable from approximately 100 to 5000 cycles per second, and this oscillator constitutes the master time base of the apparatus, all other necessary time functions being synchronized either directly or indirectly with it, and it is adjusted to an appropriate frequency for producing time markers or "pips" on the oscilloscope trace of, for example, 500 or 1000 cycles per second (2.0 or 1.0 milliseconds repetition rate). These "pips" will be observed on the oscilloscope trace, shown both in Figs. 2 and 3, each representing in this particular instance an elapsed time of 1.0 to 2.0 milliseconds.

Square wave generator 31 of any suitable type such as those available commercially on the market is preferably synchronized at a submultiple frequency of the oscillator in the range of 10 to 50 cycles per second. The pulse generator, shaper, and radio frequency modulator are preferably adjusted to modulate the output of the radio frequency signal generator which is tuned to the resonant frequency of the crystal under test, resulting in a series of pulses containing the resonant frequency of the crystal with a very steep wave front; i. e., of from 1 to 20 milliseconds' duration, and repeated at the square wave generator frequency.

The pulse modulated radio frequency signal (square-wave modulated radio frequency signal) is then applied to crystal network 36, containing the crystal under test, and the voltage developed by crystal rectifier 37 is applied to the vertical deflection input terminals of the oscilloscope, together with the time markers developed by the marker pulse generator 34 which may be another Colonial Model 700 pulse generator already mentioned, or other suitable apparatus available commercially of 40–60 microseconds' duration, and repeated at 1.0 or 2.0 millisecond intervals. The horizontal sweep generator of the oscilloscope is adjusted to the square wave generator frequency and synchronized directly with it.

If the crystal is short-circuited and no other reactive elements are included in the circuit, the pulse image on the oscilloscope will have the same characteristics as the initiating pulse and will be as shown in Fig. 3*a*; that is, it will have a steep wave front, flat top, and rapid decay.

If, now, the short-circuit is removed from the crystal, the leading edge of the pulse will now change in slope with an increased rise time, and similarly the trailing edge of the pulse will show an increased decay time. The change is exemplified in Fig. 3*b*. If the "pips" shown on both Figs. 3*a* and 3*b* and connected by dotted lines are 2.0 milliseconds apart, the crystal whose curve is shown in Fig. 3*b* is shown to have a rise time of resonant voltage of 10 milliseconds to 100% amplitude and an equal decay time to zero amplitude.

Also, it will be noted that this particular crystal rises to 50% voltage in 2.0 milliseconds and decays to 50% voltage in 2.0 milliseconds, and rises to 75% in 4.0 milliseconds and decays to 75% in 4.0 milliseconds. Some crystals will rise faster than this and may rise to 100% amplitude in a very few milliseconds and decay to 100% in the same time, while other crystals may be so slow that they do not produce 100% output during the pulse duration. This would be indicated by a failure of the curve in Fig. 3*b* to achieve zero slope before decay starts, giving the curve a more sawtooth or peaked effect.

Thus it will be seen that by adjusting the crystal (signal) pulse duration to a known value long enough for the crystal to reach maximum output, and by reading the number of time markers whose repetition rate is known, the time required for any crystal to reach any percentage of maximum output may be readily and quickly determined, and crystals whose performance fails to conform to the established standard may be rejected without the necessity of trying them in an actual receiver.

As a practical example, but not in limitation of our invention, we find the following adjustments very satisfactory:

| | |
|---|---|
| The frequency of audio oscillator 30 | 500 cycles per second |
| Square wave generator 31 | 20 cycles per second (1/25 of the master time base frequency) |
| Signal pulse duration of pulse generator 33 | 12 milliseconds |
| Frequency of radio frequency generator 32 | 455 kc. (for crystals supposed to be resonant at 455 kc.) |
| Marker pulse generator 34 | 60 microseconds' pulse duration, repetition rate 500 cycles per second, one time marker every 2.0 milliseconds. |
| Oscilloscope sweep generator of oscilloscope 35 | Synchronized at 20 cycles per second with the square wave generator |

With the crystal short-circuited, the square wave generator and the horizontal sweep oscillator are adjusted for exact synchronism with the audio oscillator; that is, until both the time marker pulses are "stopped" on the oscilloscope screen. The trace will then have the appearance shown in Fig. 3*a*. When the crystal short-circuit is removed, the trace may then take the form shown on the screen of oscilloscope 35, as shown in Fig. 2, and as shown to a larger scale in Fig. 3*b*.

We have here referred to rectifying the output of the crystal before applying it to the oscilloscope. This is not absolutely necessary, as the radio frequency output may be applied, but in general it is better to rectify, as a simpler oscilloscope suffices if the output is first rectified.

In the specification we have explained the principles of our invention and the best mode in which we have contemplated applying those principles, so as to distinguish our invention from other inventions; and we have particularly pointed out and distinctly claimed the part, improvement, or combination which we claim as our invention or discovery.

While we have shown and described certain preferred embodiments of our invention, it will be understood that modifications and changes may be made without departing from the spirit and scope thereof, as will be clear to those skilled in the art.

We claim:

1. The method of testing the time of response of a piezoelectric crystal, which comprises the step of repeatedly applying to the crystal a pulse modulated radio frequency signal of the resonant frequency of the crystal, having a steep wave front, simultaneously producing time marker pulses and producing a visible trace of the voltage output of said crystal and of said time marker pulses superimposed on each other.

2. The method of testing piezoelectric crystals, which comprises generating a radio frequency signal of the crystal resonant frequency, generating an audio frequency oscillation, producing from said oscillation square waves of a submultiple of the oscillation frequency, pulse modulating said radio frequency signal with said submultiple square waves, producing time marker pulses from said audio oscillation, impressing said modulated radio frequency signal on the crystal to be tested, and producing a visible trace of the voltage output of said crystal and said time marker pulses superimposed on each other.

3. The method of testing piezoelectric crystals, which comprises generating a radio frequency signal of the crystal resonant frequency, generating an audio frequency oscillation, producing from said oscillation square waves of a submultiple of the oscillation frequency, pulse modulating said radio frequency signal with said submultiple square waves, producing time marker pulses from said audio oscillation, impressing said modulated radio frequency signal on the crystal to be tested, rectifying the output of said crystal and producing a visible trace of the rectified output of the crystal and of said time marker pulses superimposed on each other.

4. Testing apparatus, comprising, in combination, a radio frequency signal generator of the resonant frequency of the subject to be tested, an audio oscillator, a time marker pulse generator synchronized with said audio oscillator, a square wave generator synchronized with a submultiple frequency of said audio oscillator, a pulse generator synchronized with said square wave generator, and means for pulse modulating the output of said radio frequency signal generator by the output of said square wave generator means for applying the pulse modulated radio frequency signal to the subject to be tested and means for producing from the output of the subject to be tested a visible trace of the output voltage therefrom combined with the time marker pulses from said time marker pulse generator.

5. Piezoelectric crystal testing apparatus, comprising, in combination, a radio frequency signal generator of the resonant frequency of the crystal to be tested, an audio oscillator, a time marker pulse generator synchronized with said audio oscillator, a square wave generator synchronized with a submultiple frequency of said audio oscillator, a pulse generator synchronized with said square wave generator, means for pulse modulating the output of said radio frequency signal generator by the output of said square wave generator, and means for impressing the pulse modulated radio frequency signal upon the crystal to be tested.

6. Piezoelectric crystal testing apparatus, comprising, in combination, a radio frequency signal generator of the resonant frequency of the crystal to be tested, an audio oscillator, a time marker pulse generator synchronized with said audio oscillator, a square wave generator synchronized with a submultiple frequency of said audio oscillator, a pulse generator synchronized with said square wave generator, means for pulse modulating the output of said radio frequency signal generator by the output of said square wave generator, means for impressing the pulse modulated radio frequency signal upon the crystal to be tested, means for rectifying the output of said crystal, an oscilloscope, and means for impressing the rectified output of said crystal and the output of the time marker pulse generator upon said oscilloscope.

7. Piezoelectric crystal testing apparatus, comprising, in combination, a radio frequency signal generator of the resonant frequency of the crystal to be tested, an audio oscillator, a time marker pulse generator synchronized with said audio oscillator, a square wave generator synchronized with a submultiple frequency of said audio oscillator, a pulse generator synchronized with said square wave generator, means for modulating the output of said signal generator by the output of said square wave generator to produce radio frequency pulses having a steep wave front, and means for applying said pulses to the crystal to be tested.

DANA W. COLE.
ROY A. GULL.
JOHN C. PONTIUS.
JOHN P. RUG.

REFERENCES CITED

The following references are of record in the file of this patent:

UNITED STATES PATENTS

| Number | Name | Date |
|---|---|---|
| 2,400,895 | Wachtman | May 28, 1946 |
| 2,408,858 | Keizer | Oct. 8, 1946 |
| 2,453,532 | Norton | Nov. 9, 1948 |
| 2,477,615 | Isbister | Aug. 2, 1949 |